Sept. 2, 1958   P. FAHLENBERG   2,849,936
PHOTOGRAPHIC CAMERA WITH EXPOSURE METER
Filed April 6, 1956
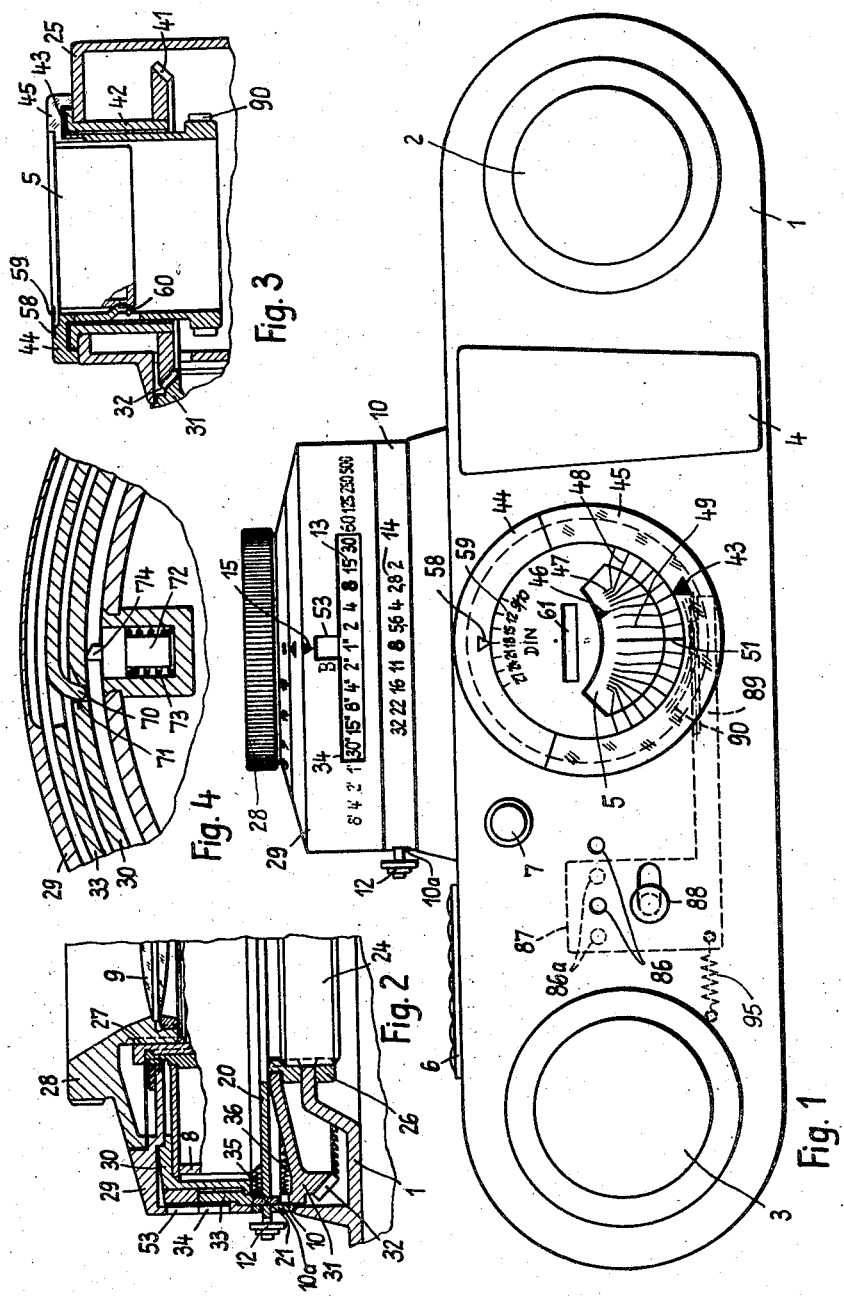

United States Patent Office 2,849,936
Patented Sept. 2, 1958

2,849,936

PHOTOGRAPHIC CAMERA WITH EXPOSURE METER

Paul Fahlenberg, Baierbrunn, near Munich, Germany, assignor to Hans Deckel, Munich, Germany, and Friedrich Wilhelm Deckel, Zug, Switzerland Application April 6, 1956, Serial No. 576,634

Claims priority, application Germany April 7, 1955

19 Claims. (Cl. 95—10)

This invention relates to a photographic camera with a built in exposure meter. An object of the invention is the provision of a generally improved and more satisfactory construction of this kind.

Another object is the provision of a camera structure having as nearly as possible a completely automatic setting of the variable factors which go into making the picture, embodied in a structure sufficiently simple so that it may be operated by an inexperienced person.

Still another object is the provision of a camera and exposure meter structure having simple setting means to take account of variations in film speed or filter factor or both, and in which the other variables, such as shutter speed and diaphragm aperture, may be set very quickly and simply by moving an indicating member to a predetermined position which in turn is determined by the position of the needle or pointer of the exposure meter.

A further object of the invention is the provision of an improved camera structure in which, after the simple setting to the position indicated by the exposure meter has been achieved, there is still the possibility of varying either the shutter speed as may be required to obtain proper pictures of moving objects, or the diaphragm aperture as may be required to obtain a desired depth of field, without disturbing the total exposure value as previously determined by the exposure meter in conjunction with the setting for film speed and filter factor.

These and other desirable objects may be attained in the manner disclosed as an illustrative embodiment of the invention in the following description and in the accompanying drawings forming a part hereof, in which:

Fig. 1 is a top plan view of a camera equipped with an exposure meter, shutter unit, and other parts in accordance with a preferred embodiment of the invention;

Fig. 2 is a fragmentary radial section taken through the shutter unit of Fig. 1, and associated parts of the camera;

Fig. 3 is a fragmentary vertical section taken along the optical axis, illustrating details of the exposure meter parts; and Fig. 4 is a fragmentary section through the shutter unit, taken on a plane perpendicular to the optical axis.

The same reference numerals throughout the several views indicate the same parts.

Referring to the drawings, there is shown a typical form of camera body 1 to which the present invention may be applied, the camera body having a knob 2 for advancing film and a knob 3 for rewinding the film into the cassette or holder. A view finder 4 is provided on the top of the camera body. Also built into the top of the camera body is an exposure meter 5 electrically connected with the photoelectric cell 6 arranged at the front of the camera body, the cell being positioned to receive light approaching the camera along the optical axis, from the object to be photographed. As usual in miniature cameras, connections are provided for tensioning or cocking the shutter each time that the film is advanced by turning the knob 2. After the shutter has been tensioned or cocked, it is released or triggered to make an exposure by pressing down on the release plunger 7 which projects above the top of the camera body.

Mounted on the front wall of the camera is the shutter unit which includes the usual annular casing or housing 8, and a suitable objective lens, the front element or component of which is shown at 9 in Fig. 2. The shutter is provided with the usual internal mechanism within the annular part of the housing for opening and closing the shutter blades at a variable speed to produce exposures of variable duration. The shutter also has the usual adjustable iris diaphragm, the aperture of which is adjusted by turning an internal ring 20 rotatable about the optical axis. A portion of the diaphragm setting ring 20 is extended radially outwardly to form a resilient arm terminating in an externally accessible knob 12, the radial arm passing through an axially extending slot 10a in an external diaphragm setting ring 10 which is rotatable on the outside of the shutter casing, about the optical axis as a center, and which carries a diaphragm aperture scale 14 which is read in conjunction with a fixed reference mark or index 15. With this arrangement, the knob 12 may be swung in a direction circumferentially around the shutter casing, and such movement will cause corresponding movement of the internal diaphragm aperture adjusting ring 20, to change the size of the diaphragm aperture, and will likewise cause corresponding rotary movement of the external diaphragm aperture adjusting ring 10 which carries the scale 14. Also, the knob 12 may be moved forwardly or rearwardly to a slight extent, in a direction parallel to the optical axis, to an extent permitted by the length of the axial slot 10a. The resilience of the radial arm normally holds it at the forward end of the slot 10a.

The usual rear lens tube of the shutter casing 8 extends rearwardly through a suitable aperture in the front wall of the camera body 1, and is held therein by means of a nut 26 screwed onto the external threads of the rear lens tube. The front lens mount of the shutter unit, which carries the front lens component 9, is indicated at 28. It may be a stationary member, but preferably is mounted by means of a screw thread 27 on the usual stationary front lens tube of the shutter casing, so that by turning the mount 28 it is made to travel axially, to focus the lens.

Behind the focusing mount 28, the shutter is provided with a stationary covering cap 29 which covers the front wall of the shutter and extends rearwardly in cylindrical fashion around the outside of the normal shutter casing or housing 8. Inside and protected by this cap 29 is the shutter speed setting ring 30 which rotates about the optical axis as a center and is suitably connected in known manner to the internal mechanism of the shutter so that when ring 30 is turned, it will serve to adjust the operating mechanism to secure a longer or shorter time of exposure. The connection of the ring 30 to the internal mechanism, and the construction of the internal mechanism itself, may be widely varied, and the details are not important for the purposes of the present invention. They may be constructed, for example, substantially as shown in U. S. Patent No. 1,687,123 of Deckel and Geiger. This shutter setting ring 30 has an approximately cylindrical skirt or flange portion which extends rearwardly around the periphery of the shutter housing 8, as well seen in Fig. 2. It will be noted that the setting ring 30 is entirely enclosed by the stationary cap 29, so that in normal usage there is no possibility of grasping the speed setting ring 30 by the fingers and no possibility of turning this ring to adjust the shutter speed, except by the special setting mechanism provided in accordance with the present invention.

Rotatable around the outside of the cylindrical flange of the member 30, but inside the stationary cap 29, is a band or ring 33, concentric with the members 30 and 29 and with the optical axis. This ring 33 carries the shutter speed scale 13 graduated as shown in Fig. 1, the graduations thereon being visible through the sight window 34 in the cap 29, and being read in conjunction with the index mark or reference point 15 marked on the stationary cap 29.

The rear edge of the graduated ring 33 is provided with serrations or teeth 35 extending circumferentially and adapted to cooperate with the front end of one or more coupling teeth 21 on the resilient radial arm of the ring 20 which carries the knob 12.

Rotatable on the rear part of the shutter unit, about the optical axis as a center, is the gear 31 having beveled gear teeth 32 which mesh with beveled gear teeth 41 on the light meter unit, as will be further described below. On its forward side, this gear 31 has serrations or coupling teeth 36, adapted to cooperate with and be coupled to the rear end of the same coupling teeth 21 on the member 20. The teeth 36 on the gear 31 are spaced sufficiently far rearwardly from the teeth 35 on the member 33, so that the coupling teeth 21 cannot be in engagement with both of the sets of teeth 35 and 36 at the same time.

As already mentioned, the resilience of the member 20 normally holds the arm and coupling tooth 21 in a forward position, in coupled engagement with the teeth 35 of the shutter speed ring 33. However, if rearward pressure is applied to the knob or finger piece 12, to spring the arm of the member 20 rearwardly, then the coupling tooth 21 becomes disengaged from the teeth 35 of the ring 33 and becomes engaged with the teeth 36 of the gear 31, so long as the rearward pressure on the knob 12 is maintained. When this rearward pressure is released, the knob 12 will again spring axially forwardly to disengage coupling tooth 21 from the teeth 36 and engage it with the teeth 35.

Since the shutter speed rings 30 and 33 and the gear 31 are enclosed within the stationary cap 29, there is no possibility of turning either of these rings 30 and 33 or the gear, except by means of knob 12. When the knob 12 is in its normal or forward position, coupled to the ring 33, any circumferential or peripheral motion of the knob 12 will result in corresponding circumferential or peripheral motion of both the ring 10 and the ring 33, and under normal circumstances the circumferential movement of this ring 33 will be transmitted also to the shutter speed setting ring 30 through the coupling parts 70, 71 as explained below. The shutter speed scale 13 on the ring 33 and the diaphragm aperture scale 14 on the ring 10 are graduated in complementary fashion, as well seen in Fig. 1, so that any angular movement of the knob 12, effecting a given change in the diaphragm aperture, will cause a complementary change in the shutter speed sufficient to compensate for the change in aperture. The graduations are preferably uniformly spaced, each successive graduation in one direction on the shutter speed scale indicating, for example, an exposure duration one-half as great as previous graduation, while each successive graduation in the same direction on the diaphragm aperture scale (preferably graduated in f numbers) corresponds to an aperture area twice as great as the previous one.

As already noted, the beveled gear teeth 32 on the gear 31 mesh with the beveled gear 41 which is fastened to a vertical tube 42 constituting part of the light meter assembly built into the top of the camera body. The tube 42 is rotatable about a vertical axis substantially perpendicular to the optical axis of the shutter unit. On a flange at the top of the rotatable tube 42 is a follow-up indicator or reference mark 43 which is visible through a transparent part 45 at the rear of a covering cap 44 which overlies member 42 and forms the top closure for the exposure meter unit, and which is extended downwardly inside the tube 42 and rotatable relative thereto.

The exposure meter mechanism unit 5 is mounted inside the vertical tube of the member 44 and contains a needle or pointer 46 connected in the usual manner to the moving coil of a galvanometer connected in the electric circuit with the photoelectric cell 6, so that the position of the needle or pointer 46 depends upon the intensity of light falling on the photo cell 6 from the object to be photographed. As the light intensity varies, the needle 46 moves over a graduated scale 47. A second graduated scale 48, preferably with uniform divisions, is also carried by the top of the meter 5 and cooperates with the follower pointer or reference mark 43. Because of the well known characteristics of a photoelectric cell, the scale 47 on which the pointer 46 moves is not uniformly graduated, the graduations being crowded closer together at the two ends of the scale and being farther apart near the center, as plainly seen in Fig. 1. Since the graduations of this scale 47 thus do not correspond linearly with the graduations 48 for the pointer 43, the corresponding graduations of the scales 47 and 48 are connected to each other by lines 49, distorted where necessary in order to make effective connection between the corresponding scale graduations, as shown.

Of course the scale 47 may be evened up or made linear with the scale 48 by other means instead of the distortion lines 49. For example, a non-linear resistance may be inserted in the electrical circuit between the photoelectric cell 6 and the moving coil to which the pointer 46 is connected.

The exposure meter is designed so that the speed of the film used in the camera can also be taken into account. To this end, the casing of the unit 5 of the exposure meter proper is mounted so that it can be displaced rotationally as a whole within the mount 44, 45, to any required extent, its adjusted position being determined by a reference mark 58 on the top flange of the mount 44, read in conjunction with a film speed scale 59 marked on the top of the exposure meter casing 5. The exposure meter is held fast in any position to which it may be turned by the resilient detent 60 (Fig. 3) which is struck up from the vertical tube of the member 44 and engages frictionally against a side of the exposure meter. The meter can be turned by a coin or a screwdriver inserted into a slot 61 formed in its top. The scale 59 is graduated in any suitable units of film speed, those of the German or DIN system being shown for the sake of illustration. If a filter is to be employed, the appropriate filter factor is taken into account when setting the meter, so that it is turned to bring the appropriate graduation 59 representing film speed plus filter factor, opposite the index mark or reference point 58.

In using the construction thus far described, the meter 5 is first turned to set it for the film speed of the film used in the camera, plus the filter factor if any, the appropriate film speed rating (adjusted for filter factor) being set on the scale 59 opposite the pointer 58. Then the setting knob 12 of the shutter unit is grasped and moved rearwardly toward the camera body, to uncouple it from the teeth 35 of the shutter speed setting parts and couple it with the teeth 36 of the gear 31 which controls the meter follower member 43. While the knob 12 is in this rearward position, it is then swung circumferentially in one direction or the other, to bring the pointer 43 opposite the light meter needle 46; that is, opposite the graduation of the scale 48 which is connected by one of the lines 49 to the graduation of the scale 47 which is in alignment with the meter pointer 46.

When this setting of the pointer 43 is accomplished, the rearward pressure on the knob 12 is relieved, so that the resilient action of the member 20 moves the knob 12 forwardly again, to uncouple it from the gear 31 and to couple it to the ring 33 which carries the shutter speed scale 13. The shutter parts have been set to the proper exposure value, that is, one of various pairs of values (shutter speed and diaphragm aperture) appropriate to the light intensity, film speed, and filter factor. But with this same light value setting, there is a considerable choice of pairs of values which the operator may select without changing the exposure value. By swinging the knob 12 circumferentially (without displacing it rearwardly) the shutter speed and the diaphragm aperture are both changed simultaneously in a complementary manner. Thus the operator may select a relatively fast shutter speed and relatively large diaphragm aperture, if he is to photograph a rapidly moving object, or may select a slower shutter speed and a correspondingly smaller diaphragm aperture, if he wishes to obtain great depth of field. The arrangement is very convenient, for the setting of the shutter unit is all accomplished by the single manually operable knob 12, simply moving it circumferentially around the optical axis without rearward pressure when shutter speed and diaphragm aperture are to be changed in a complementary manner without change of exposure value, and moving the knob circumferentially while displacing it rearwardly when the exposure value is to be changed on account of a brighter or dimmer illumination of the object, or a faster or slower film speed, etc.

In choosing a particular pair of values (that is, shutter speed and diaphragm aperture), the operator observes the scales 13 and 14 and reads the values which are opposite the fixed reference point or mark 15. When the adjusting knob 12 is moved circumferentially while in its normal forward position, both scales 13 and 14 move circumferentially through equal amounts, so that the two scales are not displaced relative to each other, but different pairs of values on the two scales are brought opposite the index mark 15.

When the adjusting member 12 is displaced rearwardly so that it is uncoupled from the shutter speed scale 13 and coupled to the follower pointer 43, the shutter speed scale 13 must remain stationary and must not be moved accidentally. Therefore, the shutter speed scale member 33 is provided with spring detent means or suitable friction means tending to hold it stationary, so that it will not move while the knob 12 is uncoupled from it. The same is true of the gear 31, which likewise must not move accidentally when the knob 12 is uncoupled from it and coupled to the shutter speed adjustment member 33.

In order to facilitate initial assembly of the parts and also to be able to check the correct relationship to be sure that there has been no accidental turning movement of the members 31 and 33 when either one of them is uncoupled from the knob 12, it is desirable to provide indicating means showing a predetermined standard setting position, conformity with which will give assurance that the parts are in proper adjustment relative to each other. This is accomplished by special markings to show a predetermined shutter speed and predetermined diaphragm aperture for which the shutter can be set when the light meter is at a predetermined value.

The selected values of the various scales, for installation and checking purposes, may be indicated by having these values in a different color, as for example in red while the rest of the scales are black or white, or may be indicated by engraving the selected scale divisions more heavily or deeply to make them more conspicuous, the latter arrangement being shown in Fig. 1. It is seen that on the scale 13 the numeral 8 (indicating a shutter speed of 1/8 of a second) is engraved heavier and more conspicuous than the other graduations of the scale. Likewise on the diaphragm aperture scale 14, the numeral 8 (indicating an f value of 8) is heavier and more conspicuous, and on the light meter scale 47, 48 the line 51 at the center is more conspicuous. Whenever it is decided to test the proper adjustment or orientation of the parts relative to each other, the operator can manipulate the knob 12 to bring the follower pointer 43 opposite the line 51 while the middle value 18 of the film speed scale 59 is opposite the mark 58, and this should result in bringing the numeral 8 of the diaphragm scale 14 opposite the numeral 8 of the shutter speed scale 13. If this happens, the operator knows that the parts are in proper adjustment. But if the bringing of the pointer 43 to the heavy line 51 does not result in bringing the numeral 8 of the diaphragm aperture scale 14 opposite the numeral 8 of the shutter speed scale 13, then the operator knows that the parts are out of adjustment because of some movement or slipping of either the gear 31 or the member 33 while it was uncoupled from the knob 12, and appropriate adjustment can be made.

In the preferred arrangement shown in the drawings, the visible shutter speed setting member 33, carrying the scale 13, is not integral with the shutter speed setting member 30 proper, but is capable under certain circumstances of rotational movement relative to the member 30. Thus the member 33 may carry a shutter speed scale which includes not only speed values which can be automatically or internally timed by the shutter mechanism, but also speed values for exposures of longer duration, which must be externally timed as by using a watch or clock. Throughout the range of instantaneous or internally timed exposure speed, the member 33 carrying the speed scale remains firmly coupled to the actual speed adjusting member 30 and turns therewith. But when the member 30 moves one step beyond the longest duration of exposure which can be internally timed (such as 1 second, for example) it reaches the "B" or bulb exposure position, and can turn no further. At this time, a marking "B" on the member 30 becomes visible through the notch 53 in the window 34, and the "2 seconds" marking of the scale 13 comes opposite the reference point 15. Further movement of the member 33 in the direction of a longer or slower exposure is accomplished by uncoupling it from the member 30, so that the exposure time scale may be extended on the member 33 to indicate exposures of many seconds or even several minutes duration. In this way, the light meter may be used to determine the proper length of exposure of long exposures which must be externally timed, as well as the shorter exposures which are internally timed by the shutter mechanism.

The coupling and uncoupling of the member 33 and the member 30 is accomplished by the construction shown in Fig. 4. The scale ring 33 has a resilient ear 70 stuck inwardly from it, which normally is seated in an opening or notch 71 of the speed adjusting ring 30. Throughout the range of instantaneous or internally timed exposures, the ear 70 remains seated in the notch 71, with sufficient force so that the turning movement imparted to the ring 33 by manipulation of the knob 12 will serve also to cause corresponding turning of the ring 30. The exposure duration of 1 second is the slowest exposure which can be internally timed, and in Figs. 1 and 4 the parts are shown for such an exposure.

If now the knob 12 is manipulated still further to the right, the member 30 cannot turn further to the right because it has reached the limit of its motion. Therefore the turning for the ring 33 by the knob 12 causes the resilient ear or spring detent 70 to spring out of the notch 71, after which the ring 33 can turn further to the right without carrying the ring 30 with it. At this time, the notch 71 has been brought opposite the detent 74 (Fig. 4) which is on the end of the plunger 72 pressed radially outwardly by the spring 73, and when the ear 70 springs out of the notch 71, the tooth 74 enters the notch, thereby holding the ring 30 against accidental displacement from its "B" or bulb position, especially during the return or leftward movement of the member 33 after it has turned further to the right. Were it not for detent 74, the friction of the resilient ear 70 riding on the periphery of the ring 30 might cause the ring 30 to turn leftwardly. When the ring 33 is returned to the "2 second" position, the resilient ear 70 comes opposite the notch 71, and it springs into this notch with greater spring force than that exerted by the spring 73, thereby displacing the tooth 74 radially inwardly against the force of the spring 73 and thus unlatching the ring 30 for subsequent leftward movement whenever the ring 33 is turned to the left by manipulating the knob 12. Thereafter the parts 30 and 33 will remain coupled to each other, to turn together as a unit, until it is attempted to turn them rightwardly beyond the "2 second" position, whereupon they will once more be uncoupled from each other. The normal engagement of the tooth 10a with the teeth 35 produces a coupling force greater than that needed to disengage the ear 70 from the notch 71.

With this arrangement, the shutter speed scale 13 can be extended as far as desired, for time or bulb exposures of any desired duration, which can be easily calculated by bringing the desired diaphragm aperture on the scale 14 opposite the reference mark 15 (after bringing the follower mark 43 to the proper relation to the needle 46) and then observing what duration of externally timed exposure is indicated on the scale 13 opposite the reference mark 15. Conveniently the shutter speed scale is continued through the exposures of 1 second, 2 seconds, 4 seconds, 8 seconds, 15 seconds, 30 seconds, 1 minute, 2 minutes, 4 minutes, and 8 minutes, each successive graduation of the scale indicating substantially a doubling of the exposure time, just as is the case in that part of the scale which relates to shorter and automatically timed exposure.

Conveniently the graduations on the scale 13 for exposures of longer duration than 1 second are made of a different color from the graduations relating to shorter exposures, thus serving as an added warning to the operator that these exposures must be externally timed, if he does not happen to notice that the designation B has appeared in the window 53 or that the second symbol and minute symbol are used with the scale numerals.

In order to increase the sensitivity of indication of the exposure meter for small light intensities, there is preferably provided an additional or supplementary photoelectric cell having electric circuit connections terminating in prongs which may be inserted in the sockets 86 at the top of the camera body 1, which sockets are suitably connected in the electric circuit from the photocell 6 to the meter 5. These sockets 86 are accessible for insertion of the prongs of the supplementary cell only when a slide 87 having matching prong openings 86a is moved toward the right by means of its knob 88, against the leftward pulling force of a spring 95. An extension 89 on the slide 87 is provided with rack teeth which mesh with gear teeth 90 on the tubular member 44 of the exposure meter so as to turn the exposure meter to an extent which corresponds to the gain in sensitivity obtained by the use of the additional or supplementary photoelectric cell. When the supplementary cell is removed from the camera, the removal of the prongs thereof from the holes 86 and the then alined holes 86a serves to release the slide 87 so that the spring 95 can pull this slide automatically leftwardly to its normal rest position, so that the rack engaging the gear teeth 90 automatically turns the light meter part 44 back to its normal position.

It will be noted that in accordance with this invention, the shutter unit has the usual two setting members, one for shutter speed and the other for diaphragm aperture, but only one of these can be set from the outside, the other setting number being enclosed so that it cannot be set from the outside and can be set only when coupled to the first setting member. Also, the first setting member which is externally adjustable may be uncoupled from the second or externally inaccessible setting member of the shutter unit and may be coupled to what may be described as a follower member or follow-up pointer of the light meter or exposure meter. In the preferred form here illustrated, the first or externally adjustable setting member of the shutter unit is the diaphragm aperture setting member, and it is the shutter speed setting member which is externally inaccessible and movable only by the coupling connection with the first setting member. However, it will be understood by those skilled in the art that it is within the scope of this invention to reverse the arrangement, and to utilize the shutter speed setting member as the first or externally accessible setting member which can be coupled at will alternatively to the other setting member (which in this reversed arrangement would be the diaphragm aperture setting member) or to the follower member of the light member.

It is seen from the foregoing disclosure that the above mentioned objects of the invention are well fulfilled. It is to be understood that the foregoing disclosures are given by way of illustrative sample only, rather than by way of limitation, and that without departing from the invention, the details may be varied within the scope of the appended claims.

What is claimed is:

1. A photographic camera including an exposure meter having means for giving an indication, a movable follower member shiftable to a position corresponding to the indication given by said exposure meter, a shutter speed setting member, a diaphragm aperture setting member, and means for operatively connecting one of said setting members at will either to the other of said setting members or to said follower member to move the same.

2. A construction as defined in claim 1, in which said one of said setting members is provided with a handle for manual actuation, and including means enclosing the other of said setting members to such extent that the other of said setting members is normally incapable of manual actuation except when operatively connected to and through the medium of said one of said setting members.

3. A construction as defined in claim 1, further including restraining means for restraining the other of said setting members and said follower member against movement when not operatively connected to said one of said setting members.

4. A construction as defined in claim 1, in which said one of said setting members capable of being operatively connected to the other of said setting members or to said follower member is the setting member for setting the diaphragm aperture.

5. A construction as defined in claim 1, further including a shutter speed scale member separate from and normally coupled to said speed setting member, said means for operatively connecting said two setting members being effective through said scale member.

6. A construction as defined in claim 1, further including a shutter speed scale member separate from and movable relative to said speed setting member, and means for operatively coupling said scale member to said speed setting member to move together as a unit through part of the range of travel of said scale member and uncoupling said scale member to move independently of said speed setting member through another part of the range of travel of said scale member.

7. A construction as defined in claim 6, in which the part of said scale member which is effective when coupled to said speed setting member is graduated to indicate durations of short exposures which may be internally timed by connected shutter mechanism, and the part of said scale member which is effective when uncoupled from said speed setting member is graduated to indicate durations of longer exposures which must be externally timed.

8. A construction as defined in claim 6, further including means for holding said speed setting member in a predetermined fixed position while it is uncoupled from said scale member.

9. A construction as defined in claim 8, in which said holding means is disengaged by reengagement of said coupling means between said scale member and said speed setting member.

10. A photographic camera comprising an exposure value member movable to various positions representing various different exposure values, a diaphragm aperture setting member, a shutter speed scale member, a shutter speed setting member, means operatively connecting said aperture setting member alternatively in driving relation either to said exposure value member while disconnected from said speed scale member or to said speed scale member while disconnected from said exposure value member, and means coupling said speed scale member to said speed setting member in driving relation thereto throughout a part only of the range of travel of said speed scale member.

11. A construction as defined in claim 10, further including a light meter having an indicating member mounted in proximity to said exposure value member to serve as a guide for positioning said exposure value member by movement of said aperture setting member.

12. A construction as defined in claim 11, in which said light meter comprises a first photoelectric cell, further including means for removably mounting a second photoelectric cell, and interlocking means for shifting the position of said meter indicating member when said second photoelectric cell is mounted in effective position, as compared to the position of said indicating member when said second photoelectric cell is not mounted.

13. A construction as defined in claim 12, further including resilient means for automatically restoring said meter indicating member to appropriate position when said second photoelectric cell is removed from a mounted position.

14. A construction as defined in claim 10, further including an accessible handle connected to said aperture setting member for moving the same, and housing means enclosing said speed scale member, said speed setting member, and said exposure value member to restrict access thereto for moving the same except when moved by manipulation of said handle.

15. A photographic camera including a camera body, a shutter mounted on said body and having an optical axis, a shutter speed adjusting ring mounted on said shutter for rotation about said optical axis, a shutter speed scale member also mounted on said shutter for rotation about said optical axis, resilient means coupling said scale member to said adjusting ring for conjoint rotation through a part only of the range of movement of said scale member, said scale member having a greater range of rotary movement than said adjusting ring, a diaphragm aperture adjusting member also mounted on said shutter for rotation about said optical axis, a photoelectric exposure meter mounted on said camera body, a meter controlling gear mounted on said shutter for rotation about said optical axis, means operatively connecting said gear to said meter to control said meter from rotation of said gear, a manually accessible operating handle mounted on said shutter for rotating about said optical axis, said handle being permanently connected to one of said rotary members on said shutter in fixed position of rotary orientation relative thereto, coupling means for coupling said handle selectively either in rotary driving relation to the other of said rotary members in any selected one of a series of positions of orientation relative thereto while remaining operatively disconnected from said gear or in rotary driving relation to said gear in any selected one of a series of positions of orientation relative thereto while remaining operatively disconnected from the other of said rotary members, and resilient means tending to keep said handle normally coupled to said other of said rotary members.

16. A photographic camera including a camera body, a shutter mounted on said body and having an optical axis, a shutter speed adjusting ring mounted on said shutter for rotation about said optical axis, a shutter speed scale member also mounted on said shutter for rotation about said optical axis, resilient means coupling said scale member to said adjusting ring for conjoint rotation through a part only of the range of movement of said scale member, said scale member having a greater range of rotary movement than said adjusting ring, a diaphragm aperture adjusting member also mounted on said shutter for rotation about said optical axis, a photoelectric exposure meter mounted on said camera body, a meter controlling gear mounted on said shutter for rotation about said optical axis, means operatively connecting said gear to said meter to control said meter from rotation of said gear, a manually accessible operating handle mounted on said shutter for rotation about said optical axis, said handle being permanently connected to one of said rotary members on said shutter in fixed position of rotary orientation relative thereto, coupling means for coupling said handle selectively either in rotary driving relation to the other of said rotary members in any selected one of a series of positions of orientation relative thereto while remaining operatively disconnected from said gear or in rotary driving relation to said gear in any selected one of a series of positions of orientation relative thereto while remaining operatively disconnected from the other of said rotary members, and housing means enclosing said speed adjusting ring, said speed scale member, said aperture adjusting member, and said gear and preventing manual rotation of any thereof except through rotation of said handle.

17. A photographic camera including a camera body, a shutter mounted on said body and having an optical axis, a shutter speed adjusting ring mounted on said shutter for rotation about said optical axis, a shutter speed scale member also mounted on said shutter for rotation about said optical axis, resilient means coupling said scale member to said adjusting ring for conjoint rotation through a part only of the range of movement of said scale member, said scale member having a greater range of rotary movement than said adjusting ring, a diaphragm aperture adjusting member also mounted on said shutter for rotation about said optical axis, a photoelectric exposure meter mounted on said camera body, a meter controlling gear mounted on said shutter for rotation about said optical axis, means operatively connecting said gear to said meter to control said meter from rotation of said gear, a manually accessible operating handle mounted on said shutter for rotation about said optical axis, said handle being permanently connected to said aperture adjusting member in fixed position of rotary orientation relative thereto, and coupling means for coupling said handle selectively either in rotary driving relation to said speed scale member in any selected one of a series of positions of orientation relative thereto while remaining operatively disconnected from said gear or in rotary driving relation to said gear in any selected one of a series of positions of orientation relative thereto while remaining operatively disconnected from said speed scale member, whereby said handle when coupled to said speed scale member may be rotated to adjust simultaneously the positions of said aperture adjusting member, said speed scale member, and said speed adjusting ring without affecting said exposure meter, and when coupled to said gear may be rotated to adjust simultaneously the positions of said aperture adjusting member and said gear without affecting said speed scale member and said speed adjusting ring.

18. A construction as defined in claim 17, in which said handle is located between said speed scale member and said gear and is resilient in a direction parallel to said optical axis and is biased in an axial direction toward said speed scale member to keep it normally coupled thereto, said handle being uncoupled from said speed scale member and coupled to said gear by displacing said handle in a direction parallel to said optical axis and away from said speed scale member and toward said gear.

19. A construction as defined in claim 15, in which said meter includes a tubular index member rotatably mounted on said camera body and turned by rotation of said gear on said shutter, a tubular carrier mounted concentrically within said index member and held against rotation when said index member is turned by rotation of said gear, a meter mechanism unit having a movable pointer, said unit being rotatably mounted in said carrier, means for turning said unit to various positions of orientation relative to said carrier, and resilient detent means for holding said meter unit in any position of orientation in which it is set relative to said carrier.

References Cited in the file of this patent
UNITED STATES PATENTS

| | | |
|---|---|---|
| 2,129,114 | Bernhard et al. | Sept. 6, 1938 |
| 2,209,156 | Fischer | July 23, 1940 |
| 2,584,440 | Fogle | Feb. 5, 1952 |
| 2,630,049 | Stein | Mar. 3, 1953 |